(12) United States Patent
Fujii et al.

(10) Patent No.: US 6,641,194 B2
(45) Date of Patent: Nov. 4, 2003

(54) VEHICLE EXTERIOR COMPONENT

(75) Inventors: Tetsuya Fujii, Aichi-ken (JP); Takehiko Shiraki, Aichi-ken (JP); Daiichiro Kawashima, Aichi-ken (JP); Koichi Ogiso, Aichi-ken (JP); Hiromi Hyuga, Aichi-ken (JP); Yoshimi Nagata, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/261,778

(22) Filed: Oct. 2, 2002

(65) Prior Publication Data

US 2003/0062738 A1 Apr. 3, 2003

(30) Foreign Application Priority Data

Oct. 2, 2001 (JP) ........................................ 2001-306679

(51) Int. Cl.⁷ .............................................. B62D 33/00
(52) U.S. Cl. ..................... 296/39.3; 296/39.1; 156/622; 428/110
(58) Field of Search ................ 296/39.3, 39.1, 296/1.1, 198; 264/257, 258; 181/293, 296, 284, 294, 220, 286; 156/62.2, 296, 62.8, 148; 442/104, 389; 51/298; 428/138, 110, 31; 280/850

(56) References Cited

U.S. PATENT DOCUMENTS

| | | | | |
|---|---|---|---|---|
| 1,704,048 A | * | 3/1929 | Jordan | 296/39.3 |
| 2,069,413 A | * | 2/1937 | Leadbetter | 296/39.3 |
| 2,196,615 A | * | 4/1940 | Surprenant | 296/39.3 |
| 3,616,180 A | * | 10/1971 | Newman | 156/62.2 |
| 3,816,159 A | * | 6/1974 | Newman | 156/62.2 |
| 4,083,595 A | * | 4/1978 | Maier | 296/39.3 |
| 4,276,345 A | * | 6/1981 | Maranghi | 442/104 |
| 4,282,011 A | * | 8/1981 | Terpay | 51/298 |
| 4,584,225 A | * | 4/1986 | Adelman | 296/39.1 |
| 4,585,685 A | * | 4/1986 | Forry et al. | 156/62.8 |
| RE33,200 E | * | 4/1990 | Reynolds et al. | 296/39.1 |
| 5,094,318 A | * | 3/1992 | Maeda et al. | 296/39.3 |
| 5,196,253 A | * | 3/1993 | Mueller et al. | 428/138 |
| 5,591,289 A | * | 1/1997 | Souders et al. | 156/148 |
| D378,812 S | * | 4/1997 | Aycock | 296/39.3 |
| 5,622,766 A | * | 4/1997 | Caballero Rodriguez et al. | 428/110 |
| 5,651,566 A | * | 7/1997 | Arenhold | 280/850 |
| 5,863,634 A | * | 1/1999 | Caballero Rodriguez et al. | 428/110 |
| 5,885,399 A | * | 3/1999 | Caballero Rodriguez et al. | 156/296 |
| 5,976,646 A | * | 11/1999 | Stevens et al. | 428/31 |
| 6,102,465 A | * | 8/2000 | Nemoto et al. | 296/39.3 |
| 6,124,222 A | * | 9/2000 | Gebreselassie et al. | 442/389 |
| 6,454,048 B1 | * | 9/2002 | Alts et al. | 181/290 |
| 2003/0062744 A1 | * | 4/2003 | Misiji et al. | 296/39.3 |

FOREIGN PATENT DOCUMENTS

| | | | |
|---|---|---|---|
| DE | 4124023 | * | 1/1993 |
| EP | 0 083 435 | * | 7/1983 |
| JP | A-10-228285 | | 8/1998 |
| JP | A-2000-264255 | | 9/2000 |

* cited by examiner

Primary Examiner—Kiran Patel
(74) Attorney, Agent, or Firm—Posz & Bethards, PLC

(57) ABSTRACT

A vehicle exterior component includes an unwoven fabric having a noise absorbing function and an additional layer attached to the unwoven fabric. The unwoven fabric includes main fibers and binder fibers. The melting point of the binder fibers is lower than that of the main fibers. The unwoven fabric further includes a mesh structure in which the main fibers and the binder fibers are intertwined and welded to each other. The mesh structure is obtained by pressing a fiber web in which the main fibers and the binder fibers are intertwined. The unwoven fabric is formed into a predetermined outer shape. The additional layer has a function other than the noise absorbing function.

18 Claims, 5 Drawing Sheets

VEHICLE EXTERIOR COMPONENT

BACKGROUND OF THE INVENTION

The present invention relates to a vehicle exterior component that has a high noise absorbing property. Particularly, the present invention pertains to a vehicle exterior component that covers the outer surface of a wheel housing to absorb noise produced by a wheel and the road surface (pattern noise), thereby preventing the noise from being transmitted to the interior of the vehicle.

Conventionally, nonwoven fabric of polyethylene terephthalate (PET) short fibers is used for guard panels, which are vehicle exterior components. Specifically, such a guard panel includes a fiber web sheet containing a high melting-point PET short fibers and a low melting-point adhesive resin pellets, which are provided in the gaps of the short fibers. The sheet is heated and pressed to melt the pellets and to form a three-dimensional shape. The melted pellets cause the fibers to be adhered to one another. The guard panel is attached to the outer surface of a wheel housing of a vehicle. The guard panel absorbs pattern noise produced by the wheel and the road surface, thereby preventing the noise from being transmitted to the interior of the vehicle.

To facilitate pressing of the guard panel into a desired three-dimensional shape, either relatively large pellets are contained in a fiber web sheet or a great number of small pellets are contained in a fiber web sheet. Therefore, after the pressing, a great number of the gaps of the PET short fibers, which form the unwoven fabric, are occupied by the pellets. This significantly hinders the formation of cells, which are spaces surrounded by the short fibers. Accordingly, the noise absorbing property of the unwove fabric is unsatisfactory.

It is generally known that a greater number of minute cells improve the noise absorbing property of unwoven fabric. However, the cells in the guard panel of the above prior art are excessively large or defectively formed. Further, since the pellets are granulated, the pellets practically cannot convert vibrational energy, which is energy of noise, to frictional energy. The pellets thus do not contribute to the noise absorption.

SUMMARY OF THE INVENTION

The present invention was made for solving the above problems in the prior art. Accordingly, it is an objective of the present invention to provide a noise absorbing material and a noise absorbing vehicle exterior component that are easily processed to have three-dimensional shapes, and have high noise absorbing property.

To achieve the foregoing and other objectives and in accordance with the purpose of the present invention, a vehicle exterior component is provided. The vehicle exterior component includes an unwoven fabric having a noise absorbing function. The unwoven fabric includes main fibers and binder fibers, the melting point of the binder fibers being lower than that of the main fibers. The unwoven fabric further includes a mesh structure in which the main fibers and the binder fibers are intertwined and welded to each other. The mesh structure is obtained by pressing a fiber web in which the main fibers and the binder fibers are intertwined. The unwoven fabric is formed into a predetermined outer shape. The vehicle exterior component also includes at least one additional layer attached to the unwoven fabric. The additional layer has a function other than noise absorbing function.

The present invention may also be applied to a fender liner used in a vehicle that has a tire condition monitoring system. The tire condition monitoring system includes a transmitter for transmitting information of a tire attached to a wheel and a receiver for receiving the transmitted information. The fender liner is located between the transmitter and the receiver. The fender liner includes a base portion made of an unwoven fabric, and a signal passing member located in the base portion. A signal transmitted from the transmitter passes through the signal passing member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described.

Figure 1:
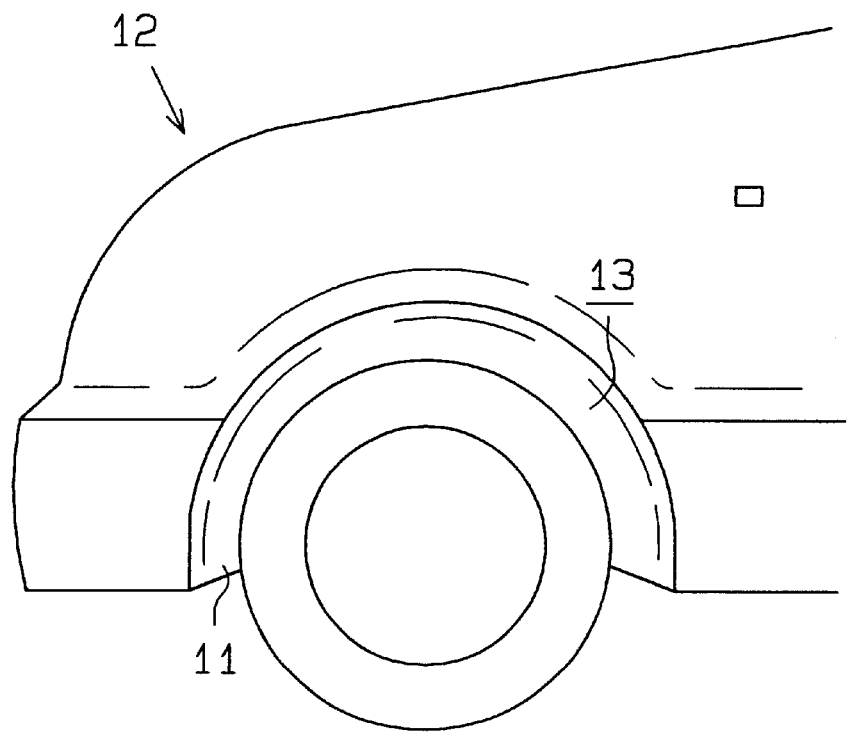
FIG. 1 is a side view showing a vehicle equipped with a guard panel according to a first embodiment.

As shown in FIG. 1, a noise absorbing vehicle exterior component, which is a guard panel 11, is attached to the outer surface of a wheel housing 13 of a vehicle 12. The, guard panel 11 is formed by pressing a sheet material made of fiber web. Specifically, the fiber web sheet is pressed to be arcuate with an L-shaped cross section. The guard panel 11 protects the outer surface of the wheel housing 13 from pebbles and mud scattered by the wheel and prevents the wheel housing 13 from being damaged. The guard panel 11 also absorbs pattern noise produced by the wheel and the road surface.

Figure 2:
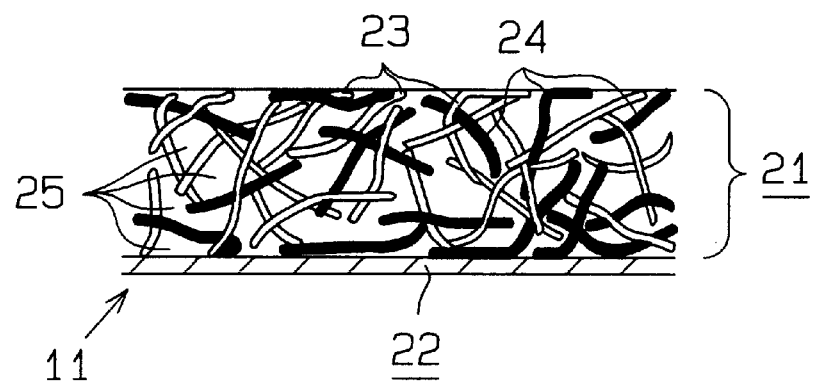
FIG. 2 is an enlarged cross-sectional view showing the guard panel of FIG. 1.

As shown in FIG. 2, the guard panel 11 has two layers. That is, the guard panel 11 includes an unwoven fabric 21 of a predetermined thickness and a water-resistant film 22 located below the unwoven fabric 21. The guard panel 11 is fixed to the outer surface of the wheel housing 13 (the outer surface of the metal body) by attaching the upper surface, on which the film 22 is not located, to the wheel housing surface.

The unwoven fabric 21 improves the noise absorbing property of the guard panel 11, and includes main fibers 23 (depicted as hollow lines in the drawing) and binder fibers 24 (depicted as solid filled lines in the drawing). The binder fibers 24 are synthetic fibers that melt when heated. The unwoven fabric 21 substantially has a web structure in which the main fibers 23 and the binder fibers 24 are intertwined and welded to one another. That is, the unwoven fabric 21 is an aggregate of spaces, or minute cells 25, each surrounded by the fibers 23, 24. The noise absorption is mainly performed by the cells 25. The noise absorbing property is improved as the number of the cells 25 is increased.

The main fibers 23 are principal fibers forming the unwoven fabric and may be natural fibers or chemical fibers. To facilitate processing of the guard panel 11 during manufacture, synthetic resin, for example, polyamide (PA) fibers such as nylon or polyester fibers such as polyethylene terephthalate (PET) are preferably used. To increase the number of the cells 25, the main fibers 23 are preferably thin. Thus, polyamide fibers such as nylon are most preferably used since the polyamide fibers are easily formed to be thin. Polyamide fibers are widely available and inexpensive. Also, polyamide fibers can be used by recycling discarded materials such as air bags.

The diameter of each main fiber 23 is preferably 10 to 30 $\mu$m to improve the processing stability of the guard panel 11 during manufacture. If the diameter is less than 10 $\mu$m, the strength may be lowered. If the diameter exceeds 30 $\mu$m, the ratio of the volume of the main fibers 23 to the entire volume of the unwoven fabric 21 is easily and significantly increased, which prevents the number of the cells 25 from being increased.

The length of each main fiber 23 is preferably 10 to 100 mm to improve the processing stability of the guard panel 11 during manufacture. Further, to increase the number of the cells 25, each fiber 23 preferably have a mechanical crimp.

Together with the main fibers 23, the binder fibers 24 are principal fibers that form the unwoven fabric 21. The binder fibers 24 are synthetic resins that are melt when heated. The binder fibers 24 are intertwined with the main fibers 23 to form a fiber web. The fiber web is pressed to form the unwoven fabric 21. Microscopically, the unwoven fabric 21 substantially has a mesh structure in which the main fibers 23 and the binder fibers 24 are intertwined and welded to one another. Macroscopically, the unwoven fabric 21 has a three-dimensional shape conforming to the outer surface of the wheel housing 13. Specifically, the unwoven fabric 21 is formed to be arcuate with an L-shaped cross-section. The fiber web may be heated prior to pressing or heated during pressing.

The binder fibers 24 may be synthetic fibers formed only of a soluble polymer the melting point of which is lower than that of the main fibers 23. Alternatively, the binder fibers 24 may be synthetic fibers formed of compound fibers (biconstituent fibers) with the soluble polymer applied to the surface. As the soluble polymer, polyester fibers such as PET are most preferably used because of their availability and low cost. As the compound fibers, sheath-core type or side-by-side type compound fibers are used. The melting point of the fiber that forms the core of the compound fiber is not necessarily lower than that of the main fiber 23. Contrarily, the melting point of the core fiber is preferably higher than that of the main fibers 23.

Since synthetic fibers formed only of soluble polymer are easily formed smaller than compound fibers, the synthetic resin formed only of soluble polymer permits a great number of the cells 25 to be formed in the unwoven fabric 21 when used as the binder fibers 24. Polyester fibers, particularly PET fibers, which have a low melting point, are used as the binder fibers 24. Further, the polyester fibers are easy to recycle.

The diameter of each binder fiber 24 is preferably 10 to 50 $\mu$m to improve the processing stability of the guard panel 11 during manufacture. If the diameter is less than 10 $\mu$m, the strength may be lowered. Also, when pressed, the binder fibers 24 having a diameter less than 10 $\mu$m are melt and cannot maintain the shape. In this case, the binder fibers 24 are less likely to contribute to the formation of the cells 25. If the diameter exceeds 50 $\mu$m, the ratio of the volume of the binder fibers 24 to the entire volume of the unwoven fabric 21 is easily and significantly increased, which prevents the number of the cells 25 from being increased.

The melting point of the soluble polymer is preferably between 80 and 170 degrees Celsius, and more preferably between 100 and 170 degrees Celsius. If the melting point of the soluble polymer is less than 80 degrees Celsius, the guard panel 11 may be deformed while being used on the outer surface of the wheel housing 13. If the melting point is higher than 170 degrees Celsius, the guard panel 11 cannot be easily processed. The melting point of the soluble polymer is preferably at least 20 degrees Celsius lower than the melting point of the main fiber 23. More preferably, the melting point of the soluble polymer is at least 50 degrees Celsius lower than that of the main fiber 23. If the difference between the melting points of the main fiber 23 and the binder fiber 24 is less than 20 degrees Celsius, it will be extremely difficult to melt only the binder fibers 24 during pressing. Thus, the mesh structure having a high noise absorbing property cannot be formed.

The length of each binder fiber 24 is preferably 10 to 100 mm to improve the processing stability of the guard panel 11 during manufacture. Further, to increase the number of the cells 25, each fiber 24 preferably has a mechanical crimp (wavy or helical curls).

The thickness of the unwoven fabric 21 is preferably between 2 and 8 mm, more preferably between 2 and 6 mm, and most preferably between 2 and 4 mm. If the thickness of the unwoven fabric 21 is less than 2 mm, the number of the cells 25 will be limited. The guard panel 11 will therefore have insufficient noise absorbing property. In contrast, a thickness greater than 8 mm is not economical. The basis weight of the unwoven fabric 21 is preferably between 800 and 1300 g/m$^2$. In this case, pattern noise of disturbing frequency 1000 to 2000 kHz is effectively absorbed. More preferably, the basis weight is between 1000 and 1300 g/m$^2$.

The fiber density of the unwoven fabric 21 is preferably between 0.01 and 0.1 g/cm$^3$. If the fiber density is less than 0.1 g/cm$^3$, the stability of the shape of the guard panel 11 will be significantly lowered. If the fiber density exceeds 0.1 g/cm$^3$, the fiber density is excessively high and no space is formed among fibers. In other words, the cells 25 may be crushed. A high fiber density also is not economical. The amount of the binder fibers 24 in the unwoven fabric 21 is preferably between 20 and 60 percent by weight, and more preferably, between 20 and 50 percent by weight. If the amount of the binder fibers 24 in the unwoven fabric 21 is less than 20 percent by weight, the three-dimensional guard panel 11 does not have sufficient shape stability. If the amount exceeds 60 percent by weight, the binder fibers 24 are not completely melt during pressing. The amount of the main fibers 23, which are important to maintain the strength of the unwoven fabric 21, is relatively lowered. This prevents the strength and the durability of the guard panel 11 from being sufficiently increased.

The water-resistant film 22 is made of olefin based resin such as polyethylene (PE), polypropylene (PP), and ethylene-butene rubber (EBR). Alternatively, the water-resistant film 22 is made of olefin based rubber such as ethylene-propylene-diene copolymer synthetic rubber (EPDM). The water-resistant film 22 is located on the lower surface of the guard panel 11, or the outer surface of the wheel housing 13. The water-resistant film 22 forms a water repellant layer. The water-resistant film 22 repels rain water and muddy water splashed by the wheel, thereby preventing the guard panel 11 from being stained.

The water-resistant film 22 is attached to the surface of the fiber web sheet, which is formed into the unwoven fabric 21, and pressed. Accordingly, the water-resistant film 22 is welded to the binder fibers 24 and adhered to the lower surface of the unwoven fabric 21. The water-resistant film 22 has a three-dimensional shape conforming to the surface of the unwoven fabric 21. To prevent the water-resistant film 22 from being melt and fractured during pressing, the melting point of the water-resistant film 22 needs to be higher than that of the binder fibers 24. Preferably, the melting point of the water-resistant film 22 is equal to or higher than that of the main fibers 23.

The thickness of the water-resistant film 22 is preferably between 0.1 and 1 mm, and more preferably between 0.2 and 0.5 mm. If the thickness of the water-resistant film 22 is less than 0.1 mm, the water-resistant film 22 will be easily ruptured. If the thickness is greater than 1 mm, pattern noise in the wheel housing 13 is less likely to enter the interior of the unwoven fabric 21, which impairs the noise absorbing property of the unwoven fabric 21.

The operation of the guard panel 11 will now be described.

When manufacturing the guard panel 11, a fiber web of dry unwoven fabric is formed into a sheet by using the main fibers 23 and the binder fibers 24. Thereafter, the fibers 23, 24 are intertwined by needle punching. Then, the water-resistant film 22 is attached to the surface (the lower surface) of the fiber web sheet. The sheet including the fiber web and the film 22 is preheated. The preheating is performed at a temperature that is equal to or higher than the melting point of the soluble polymer forming the binder fibers 24. In a case where the main fibers 23 are fibers that melt when heated, the temperature of preheating is set lower than the melting point of the main fibers 23. Immediately after preheating, the sheet is pressed and cooled by a pressing apparatus. Accordingly, the guard panel 11 having a three-dimensional shape is formed. Instead of preheating, the sheet may be heated and cooled in the pressing apparatus.

The guard panel 11 is fixed to the outer surface of the wheel housing 13 at the upper surface of the unwoven fabric 21, on which the water-resistant film 22 is not formed, to conform to the shape of the wheel housing 13. The entire outer surface of the wheel housing 13, on which the guard panel 11 is attached, is covered by the water-resistant film 22. The guard panel 11 prevents the outer surface of the wheel housing 13 from being damaged by pebbles and mud scattered from the road surface by the wheel.

The guard panel 11 also effectively absorbs pattern noise produced by the wheel and the road surface thereby significantly reducing the pattern noise that is transmitted to the interior of the vehicle 12. Specifically, pattern noise relatively easily passes the thin water-resistant film 22, which forms the outermost layer of the guard panel 11, and then enters the unwoven fabric 21. Thereafter, the energy of the noise is attenuated by the noise absorbing property of the numerous minute cells 25, which forms the unwoven fabric 21. The noise transmitted to the interior of the vehicle is thus reduced. The noise absorbing property of the cells 25 changes the frequency of the noise transmitted to the interior of the vehicle, thereby making the noise less disturbing. In this manner, the guard panel 11 prevents the occupants of the vehicle from being disturbed by noise. Further, the guard panel 11 effectively prevents failures, misoperations and malfunctions of various machines, apparatuses, and wiring (for example, filler hose) that are located in the vicinity of the wheel housing 13.

The water-resistant film 22 of the guard panel 11 repels rain water and muddy water splashed from the road surface by the wheel, which effectively prevents the outer surface of the guard panel 11 from being stained with mud and litter. The appearance of the guard panel 11 is thus maintained. Since the water-resistant film 22 prevents rain water and muddy water from entering the unwoven fabric 21, the cells 25 are not blocked, and the noise absorbing property is not degraded. If the vehicle 12 has a run-flat sensor, stain and water on the wheel housing 13 will cause electromagnetic interference. The water-resistant film 22 prevents such interference.

The advantages of the first embodiment are as follows.

The guard panel 11 of this embodiment has the unwoven fabric 21. The unwoven fabric 21 is made of the fiber web sheet. The fiber web sheet is formed by intertwining the main fibers 23 and the binder fibers 24, the melting point of which is lower than that of the main fibers 23. The fiber web sheet is then pressed to form a desired three-dimensional shape. Microscopically, the unwoven fabric 21 has a mesh structure, in which the main fibers 23 and the binder fibers 24 are intertwined and welded to each other, and has a highly effective noise absorbing property.

Since the binder fibers 24 intertwines the fibers 23, 24, and the fibers 23, 24 are welded and hardened, the macroscopic three-dimensional shape of the guard panel 11 is easily and accurately formed and reliably maintained. Together with the main fibers 23, the binder fibers 24 maintain the shape of fibers as intertwining fibers forming the unwoven fabric 21. Thus, the binder fibers 24 significantly contribute to the formation of the numerous minute cells 25 in the unwoven fabric 21. As a result, the structure (substantially mesh structure) that improves noise absorbing property of the unwoven fabric 21 is easily obtained.

When forming the fiber web sheet, the binder fibers 24 are easily mixed evenly and intertwined with the main fibers 23. Therefore, the mesh structure is easily formed evenly. Also, the binder fibers 24 easily increase the fiber density of the unwoven fabric 21 and thus increase the strength of the unwoven fabric 21.

The main fibers 23 are polyamide fibers having a diameter of 10 to 30 $\mu$m. The binder fibers 24 are polyester fibers having a diameter of 10 to 50 $\mu$m. Therefore, the unwoven fabric 21, which has a mesh structure formed of the numeral minute cells 25, is easily obtained. Although the diameters are small, the fibers 23, 24 have sufficient strength. Therefore, the numerous minute cells 25 are easily formed in the unwoven fabric 21.

The water-resistant film 22, which is made of olefin based resin or rubber, is located on the surface of the unwoven fabric 21 to form a water repelling layer. This increases the water repellency of the guard panel 11 and prevents the surface of the guard panel 11 from being easily stained. Therefore, the appearance of the vehicle 12 is easily maintained. Also, the noise absorbing property of the unwoven fabric 21 is easily prevented from being degraded. Further, the water-resistant film 22 is attached to the surface of the fiber web sheet and pressed. Therefore, the film 22 is easily adhered to the surface of the unwoven fabric 21 with the binder fibers 24. This facilitates the manufacture of the guard panel 11.

The guard panel 11 is formed into a three-dimensional shape conforming to the outer surface of the wheel housing 13 (the outer surface of the vehicle body). Therefore, the range of application of the guard panel 11 as a noise absorbing vehicle exterior component is expanded.

The first embodiment may be modified as follows.

The guard panel 11 may be formed by adhering the water-resistant film 22 to the surface of the unwoven fabric 21 with adhesive after the unwoven fabric 21 is formed by pressing the fiber web sheet.

Other than the vehicle exterior component, the guard panel 11 may be used as a vehicle interior noise absorbing material, a sound barrier material for expressways or railways, a noise absorbing material for tunnels, and architectural noise absorbing material for houses and factories.

The water-resistant film 22 may be located on the upper and lower sides of the unwoven fabric 21. Alternatively, the entire unwoven fabric 21 may be coated with the water-resistant film 22.

The main fibers 23 may be polyurethane fibers, vinylon, acrylic fibers, or polypropylene fibers.

A second embodiment will now be described with reference to the drawings. The difference from the first embodiment will be mainly discussed.

Figure 3:
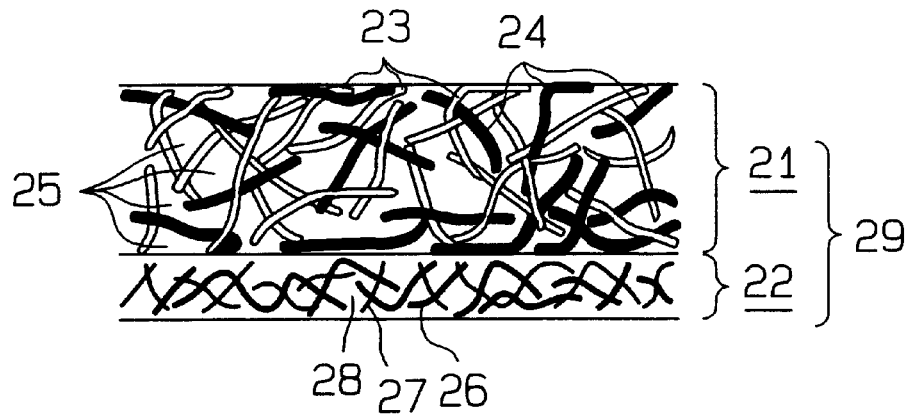
FIG. 3 is a cross-sectional view showing an exterior component used for a guard panel according to a second embodiment.

As shown in FIG. 3, a guard panel 11 of the second embodiment has an inner layer 21 and an outer layer 22. The inner layer 21 is made of an unwoven fabric having a predetermined thickness. The outer layer 22 is located below the inner layer 21 and is made of an unwoven fabric having a predetermined thickness. The guard panel 11 is fixed to the outer surface of the wheel housing 13 (the outer surface of the metal body) by attaching the upper surface of the inner layer 21, on which the outer layer 22 is not located, to the wheel housing surface.

Since the structure of the inner layer 21 is the same as that of the unwoven fabric 21 of the first embodiment, the outer layer 22 will be mainly discussed below.

The outer layer 22 improves the appearance and also the noise absorbing property of the guard panel 11. The outer layer 22 has main fibers 26 and binder fibers 27. The binder fibers 27 are synthetic fibers that melt when heated. Like the inner layer 21, the outer layer 22 is formed by intertwining the main fibers 26 and the binder fibers 27 by needle punching. The fibers 26, 27 are then welded to each other. The outer layer 22 substantially having a mesh structure is thus formed. That is, the outer layer 22 is an aggregate of spaces, or minute cells 28, each surrounded by the fibers 26, 27. Coloring agent, which is carbon particles, is applied to the main fibers 26. The carbon particles permit the guard panel 11 to have a black appearance, and thus improve the appearance. The cells 28 absorb noise.

The main fibers 26 of the outer layer 22 may be synthetic fibers such as polyester fibers (first polyester fibers), polyamide fibers (PA) such as nylon, polyurethane fibers, vinylon, acrylic fibers, or polypropylene fibers. The polyester fibers include polyethylene terephthalate (PET). The binder fibers 27 may be polyester fibers (second polyester fibers) that have a lower melting point than that of the first polyester fibers.

The outer layer 22 is formed in the same manner as the inner layer 21. That is, a fiber web sheet, in which the main fibers 26 and the binder fibers 27 are intertwined, is pressed to form the outer layer 22.

The thickness of the outer layer 22 is preferably between 0.5 and 3.0 mm, and more preferably between 1.0 and 2.5 mm. If the thickness of the outer layer 22 is less than 0.5 mm, the white color of the main fibers 23 forming the inner layer 21 are likely to be exposed. If the thickness exceeds 3.0, the cost will be increased.

As described above, the inner layer 21 and the outer layer 22 are pressed individually. Then, the layers 21, 22 are stacked and adhered to each other by pressing. Accordingly, a laminated object, which is the vehicle exterior component 29, is formed. The upper surface of the outer layer 22 is adhered to the lower surface of the inner layer 21 with the binder fibers 24 in the inner layer 21 welded to the binder fibers 27 in the outer layer 22. Alternatively, the fiber web sheets of the inner layer 21 and the outer layer 22 may be stacked and adhered to each other by a single pressing to form the vehicle exterior component 29. The inner layer 21 and the outer layer 22 are inseparably laminated.

The vehicle exterior component 29 is pressed to have a three-dimensional shape (see FIG. 4) to conform to the outer surface of the wheel housing to produce the guard panel 11. The guard panel 11 has a main body 11a. An upper opening 11b and a side opening 11c are formed in the upper portion and the side wall of the main body 11a. The upper opening 11b has a semicircular cross-section so that a suspension shaft of the vehicle 12 extends through the upper opening 11b and the side opening 11c.

Figure 4:
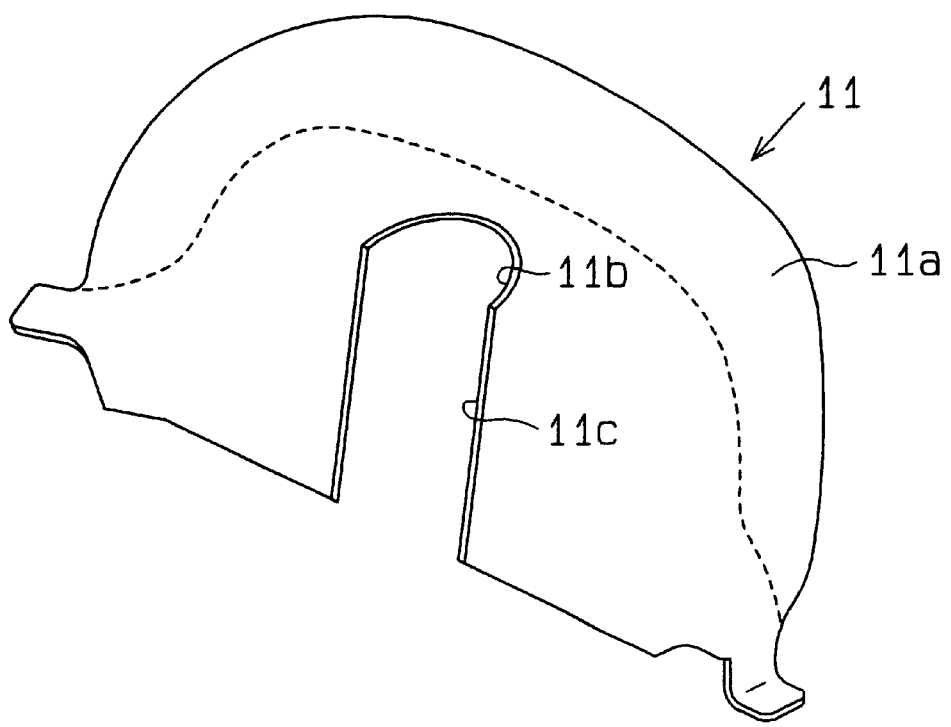
FIG. 4 is a schematic perspective view illustrating a guard panel.
Figure 5:
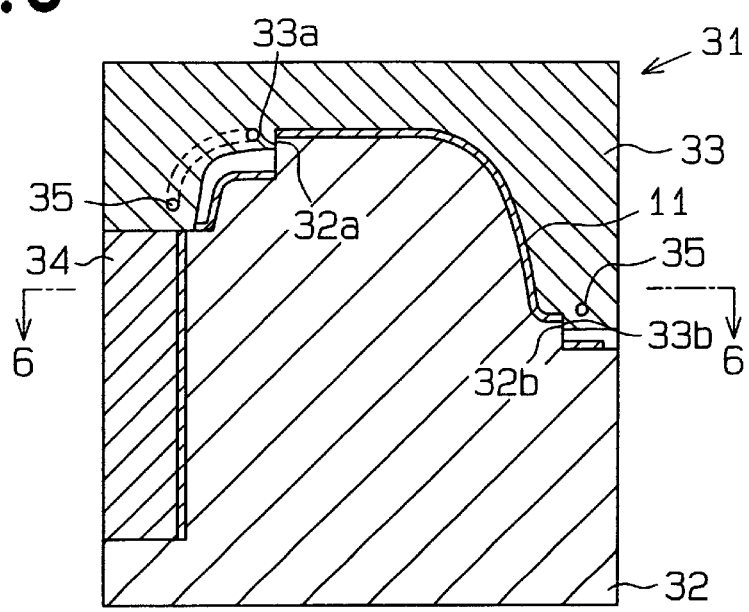
FIG. 5 is a cross-sectional view showing a clamped state of a pressing apparatus for molding a guard panel.
Figure 6:
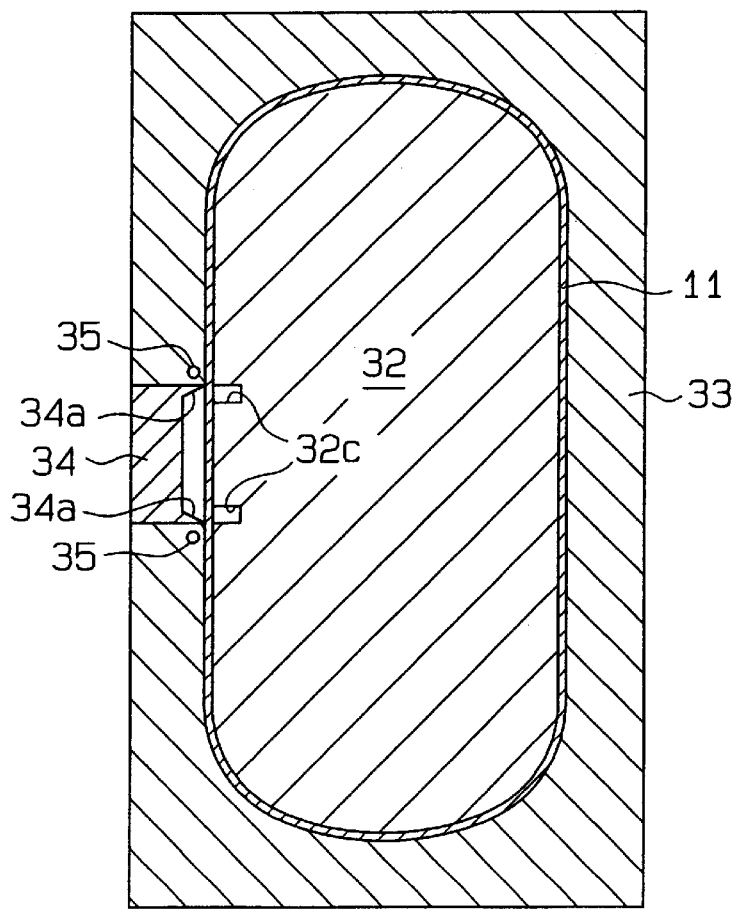
FIG. 6 is a cross-sectional view taken along line 6—6 of FIG. 5.

FIGS. 5 and 6 illustrate a pressing apparatus for pressing the guard panel 11. The pressing apparatus 31 includes a lower die 32, an upper die 33, and a slide core 34. The lower die 32 and the upper die 33 have cutter portions 32a, 33a, respectively. The cutter portions 32a, 33a trim the upper opening 11b of the guard panel 11 during pressing so that the opening 11b has a semicircular cross-section. Also, the lower die 32 and the upper die 33 have cutter portions 32b, 33b, respectively. The cutter portions 32b, 33b trim the outer lower edge of the main body 11a. As shown in FIG. 4, the slide core 34 has a blade portion 34a for trimming the side opening 11c of the guard panel 11. A groove 32c is formed in the lower die 32. The blade portion 34a enters the groove 32c.

Heaters 35 are embedded in the lower die 32 in the vicinities of the cutter portions 33a, 33b and the blade portion 34a. The heaters 35 locally heat portions of the vehicle exterior component 29 to be cut.

The method for pressing the guard panel 11 by using the pressing apparatus 31 will now be described.

First, the lower die 32 and the upper die 33, which are shown in FIG. 5, are opened. The preheated exterior component 29, which is formed as a sheet, is placed on the upper portion of the lower die 32. The preheating is performed at a temperature that is equal to or higher than the melting point of the soluble polymer forming the binder fibers 24, 27. In a case where the main fibers 23, 26 are fibers that melt when heated, the temperature of preheating is lower than the melting point of the main fibers 23, 26.

Then, the upper die 33 is lowered to press the exterior component 29 into the shape of the guard panel 11. The upper opening 11b is trimmed by the cutter portions 32a, 33a. The lower edge of the main body 11a is trimmed by the cutter portions 33b, 32b.

Further, the slide core 34 is moved rightward as viewed in FIG. 6 so that the blade portion 34a, trims the main body 11a, thereby forming the side opening 11c.

Instead of preheating, the sheet may be heated and cooled in the pressing apparatus.

After the guard panel 11 is removed from the dies 32, 33, holes for clips are formed in the peripheral portion of the guard panel 11.

The guard panel 11 is fixed to the outer surface of the wheel housing 13 at the upper surface of the inner layer 21, on which the outer layer 22 is not formed, to conform to the shape of the wheel housing 13. The black outer layer 22 is exposed on the entire outer surface of the wheel housing 13, onto which the guard panel 11 is attached. The guard panel 11 prevents the outer surface of the wheel housing 13 from being damaged by pebbles and mud scattered from the road surface by the wheel, and suppresses noise of the pebbles and mud.

The advantages of the second embodiment are as follows.

(1) The exterior component 29, which is used for the guard panel 11 according to the second embodiment, has two layers, or the inner layer 21 and the outer layer 22. The inner layer 21 is formed of the unwoven fabric. The main fibers 23 of the unwoven fabric are inexpensive polyamide fibers that are obtained from discarded material such as air bags. The discarded materials include discard of seats, which is used for making air bags, and air bags removed from scrapped cars.

The outer layer 22 is formed of the unwoven fabric having the black polyester fibers, or main fibers 26, and has a reduced thickness. Therefore, the exterior component 29 is produced at lower cost, which reduces the cost of the guard panel 11. Since the outer layer 22 is black, the appearance of the guard panel 11 is improved.

(2) In the second embodiment, the exterior component 29 is preheated before being placed in the pressing apparatus 31. Then, the peripheral portions of the exterior component 29 to be cut are heated by the heaters 35 embedded in the pressing apparatus 31. The portions to be cut of the exterior component 29 are trimmed by the cutter portions 32a, 33a, 32b, 33b and are cut by the blade portion 34a. Thus, the portions to be cut are easily cut. The cut ends of the main fibers 23, 26 are exposed at the cut surface of the guard panel 11. The cut ends of the main fibers 23, 26 are welded to one another, which prevents the main fibers from being separated from one another and thus improves the appearance. Further, since the cut ends of the main fibers 23, 26 are welded, water is prevented from entering the guard panel 11. This improves the durability of the guard panel 11.

In the second embodiment, coloring agents other than carbon may be used.

The exterior component of the present invention may be used for protector of a fuel tank or a sheet in a vehicle ceiling.

A third embodiment of the present invention will now be described with reference to FIGS. 7, 8 and 9.

Figure 7:
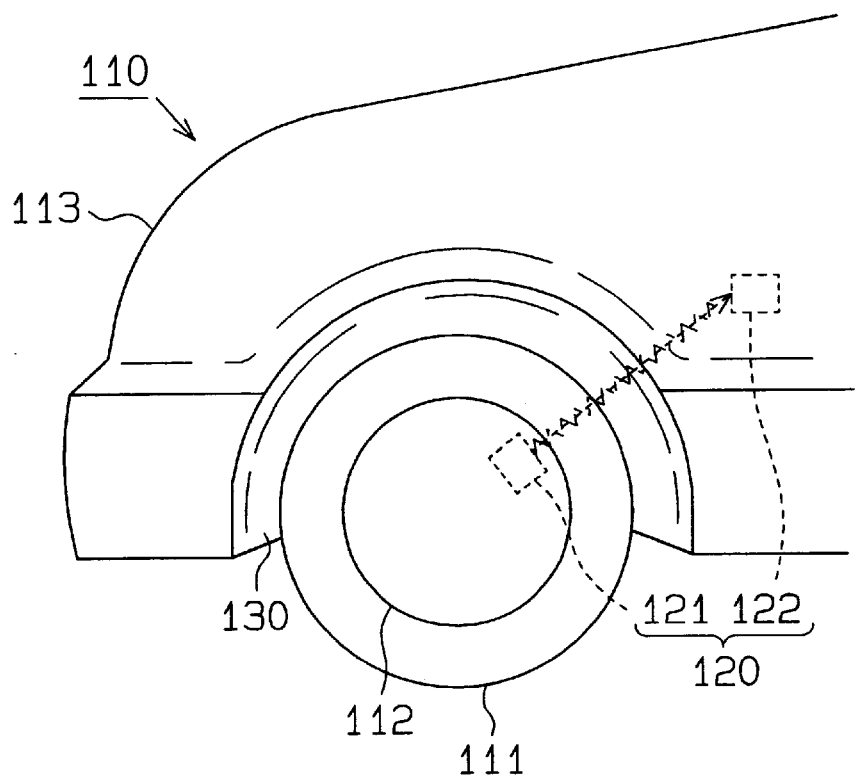
FIG. 7 is a schematic view showing a fender liner according to a third embodiment.

As shown in FIG. 7, a vehicle 110 according to this embodiment includes a tire condition monitoring system 120 for monitoring the condition of a tire 111, and a fender liner covering the outer portion of a wheel housing of the vehicle 110. The fender liner is a guard panel 130 in this embodiment. The tire 111 of the vehicle 110 is a run-flat.

The tire condition monitoring system 120 includes a transmitter 121 located in a tire wheel 112 of the vehicle 110, a receiver 122 located in the vehicle body 113, and a display (not shown) located in the passenger compartment. The system 120 detects the pressure and temperature of the tire 111 and sends the information from the transmitter 121. The information is then received by the receiver 122 and displayed on the display.

Figure 8:
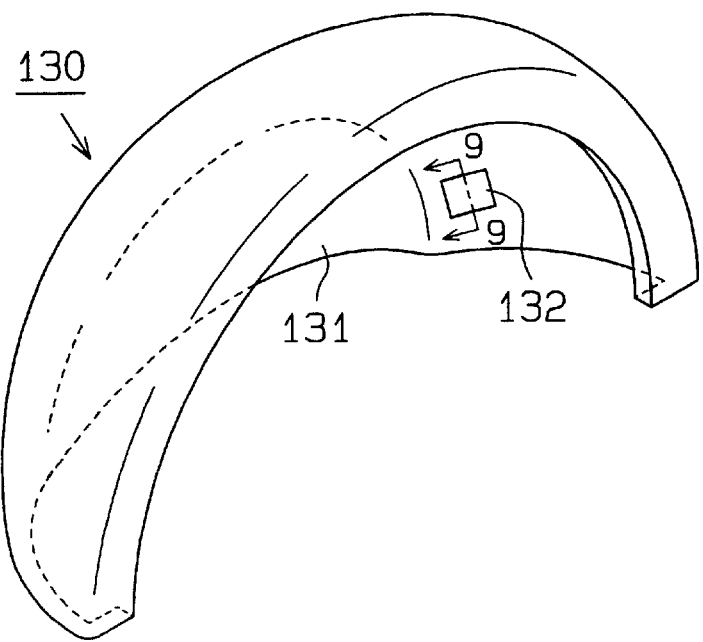
FIG. 8 is a perspective view showing a fender liner.

The most part of the fender liner 130, which is shown in FIG. 8, is made of a base portion 131. The base portion 131 is formed by pressing an unwoven fabric made of short fibers. Either natural fibers or chemical fibers may be used as the short fibers. It is preferable that the short fibers be synthetic fibers such as polyamide (PA) fibers such as nylon, or polyester fibers such as polyethylene terephthalate (PET). Particularly, polyamide fibers are advantageous since they are widely available and made by recycling discard such as air bags.

The unwoven fabric 21 of the first embodiment of the inner layer 21 of the second embodiment may be used as the material of the fender liner 130.

The fender liner 130 is located between the transmitter 121 and the receiver 122 of the tire condition monitoring system 120. In this embodiment, a signal passing member 132 is located on a part of the fender liner 130 that corresponds to the signal transmission path. The signal passing member 132 permits signals to pass. Specifically, as shown in FIG. 8, the signal passing member 132 covers an entire opening 133 formed in the base portion 131.

Figure 9:
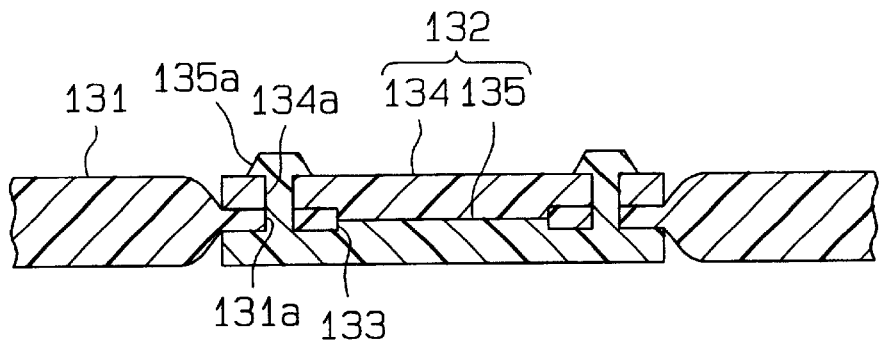
FIG. 9 is an enlarged cross-sectional view taken along line 9—9 of FIG. 8.

As shown in FIG. 9, the signal passing member 132 includes an outer plate 135 and an inner plate 134. The outer plate 135 is exposed to the exterior of the vehicle, or faces the tire 111. The inner plate 134 entirely covers a side of the outer plate 135 that faces the vehicle body 113.

The outer plate 135 has a plurality of engaging projections 135a. The inner plate 134 has a plurality of engaging bores 134a. Each engaging bore 134a corresponds to one of the engaging projections 135a. Further, the base member 131 had through holes 131a formed about the opening 133. Each through hole 131a corresponds to one of the pairs of the engaging projections 135a and the engaging bores 134a.

The engaging projections 135a are inserted into the through holes 131a of the base portion 131 and the engaging bores 134a of the inner plate 134. This holds the inner plate 134 and the outer plate 135 with portion of the base portion 131 about the opening 133 in between. Except for the sections that hold the base portion 131, the inner plate 134 and the outer plate 135 tightly contact each other. Thus, little water enters between the inner plate 134 and the outer plate 135.

The material for the signal passing member 132, which includes the inner plate 134 and the outer plate 135, is preferably non-water absorbing and insulating material that has an improved noise absorbing property and impact resistance. Such materials include olefin based thermal plastic resin (TPO), polyethylene terephthalate (PET), polypropylene (PP), and polyamide (PA). It is preferable that the thickness of the inner plate 134 and the outer plate 135 be minimized on the condition that a sufficient strength is maintained. For example, the thickness T is set between 1.5 and 2.0 mm.

Even if the base portion 131, which is formed of the unwoven fabric, contains water, the signal passing member 132, which is made of non-water absorbing material absorbs little water. Therefore, radio waves transmitted from the transmitter 121 pass the fender liner 130 through the signal passing member 132. That is, even if the base portion 131, which is made of unwoven fabric, contains water, signals are reliably exchanged between the transmitter 121 and the receiver 122 through the signal passing member 132.

The third embodiment has the following advantages.

(1) The signal passing member 132 permits signals to pass. Even if the base portion 131, which is made of unwoven fabric, contains water, signals are reliably exchanged between the transmitter 121 and the receiver 122. Therefore, the tire condition monitoring system 120 reliably operates. Further, the except for the signal passing member 132, the fender liner 130 is made of the base portion 131, which is made of unwoven fabric. The fender liner 130 therefore has an increased noise absorbing property.

(2) The signal passing member 132 is made of insulating material. Unlike a case where a conductive signal passing member is used, radio wave transmitted from the transmitter 121 is prevented from being reflected by the signal passing member 132. Therefore, the performance of the tire condition monitoring system 120 is not deteriorated by the material of the signal passing member 132.

The third embodiment may be modified as follows.

Both of the inner plate 134 and the outer plate 135 are not necessarily formed of a material having a high impact resistant and a high noise absorbing property. For example, even if the outer plate 135 is formed of a high impact resistant material, and the inner plate 134 is formed of high noise absorption material, the signal passing member 132 can have a required impact resistance and noise absorbing property. This adds to the flexibility in selection of the materials used for the signal passing member 132.

Figure 10:
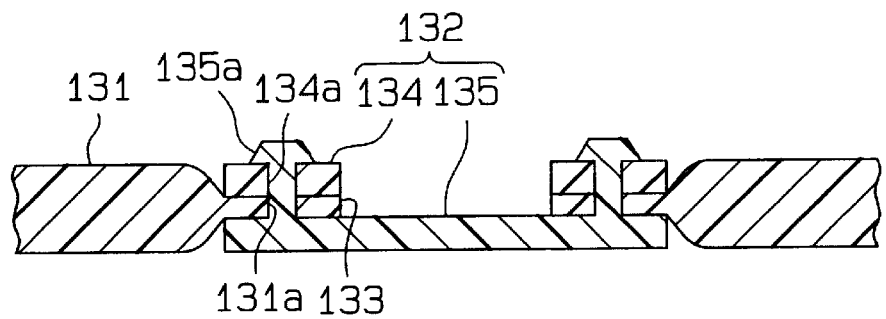
FIG. 10 is an enlarged cross-sectional view showing the attaching structure of a signal passing member according to a modified embodiment.

If the outer plate 135 satisfies the required impact resistant and noise absorbing property, the inner plate 134 may be made of any material. This permits the inner plate 134 to be made of inexpensive material such as recycled material and discarded material. This reduces the cost. In this case, if the signal passing member 132 has a sufficient strength and can be easily installed, the inner plate 134 may have the shape shown in FIG. 10. In FIG. 10, the inner plate 134 is formed to be a frame that has the engaging bores 134a.

In the third embodiment, to attach the signal passing member 132 to the base portion 131, the inner plate 134 has the engaging holes 134a, and the outer plate 135 has the engaging projections 135a. However, the inner plate 134 may have engaging projections and the outer plate 135 may have engaging bores.

In the third embodiment, signal passing member 132 may be adhered or welded to the base portion 131.

In the third embodiment, the signal passing member 132 includes the inner plate 134 and the outer plate 135. However, the signal passing member 132 may have a different structure. As long as the signal passing member 132 has the required impact resistance and noise absorbing property, one of the inner plate 134 and the outer plate 135 may be omitted.

The signal passing member 132 may have water repellency. For example, water repellent finish may be applied to the surface of the signal passing member 132. Alternatively, the signal passing member 132 may be formed of a material that has water repellency in addition to the above described properties. This reliably prevents water from staying on the signal passing member 132. Thus, radio waves transmitted from the transmitter 121 are prevented from being absorbed by water staying on the signal passing member 132. This prevents the performance of the tire condition monitoring system 120 from being deteriorated.

Figure 11:
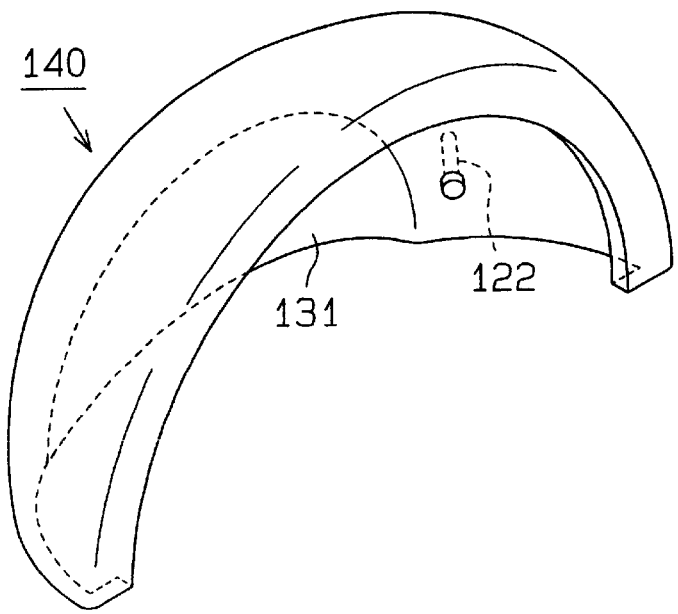
FIG. 11 is a perspective view showing a fender liner according to a modified embodiment.

In the third embodiment, the fender liner 130 has the signal passing member 132, which is made of non-water absorbing material, so that signals pass through the signal passing member 132. The signals are exchanged between the transmitter 121 and the receiver 122 through the signal passing member 132. Instead, the receiver 122 may protrude from the fender liner 140 as shown in FIG. 11.

In the third embodiment, the present invention is applied to the vehicle 10, which has run-flats. However, the present invention may be applied to vehicles of other types. The present invention may be applied to any vehicle that has tires other than run-flats as long as the vehicle has the fender liner 130, 140, and a tire condition monitoring system 120 for monitoring the condition of the tires such as the temperature.

If signals transmitted from the transmitter 121 are not radio waves, but, for example, light waves or ultrasonic waves, the signal passing member 132 is not necessarily made of insulating material.

Therefore, the present examples and embodiments are to be considered as illustrative and not restrictive and the invention is not to be limited to the details given herein, but may be modified within the scope and equivalence of the appended claims.

What is claimed is:

1. A vehicle exterior component, comprising:
   an unwoven fabric having a noise absorbing function;
   wherein the unwoven fabric includes main fibers and binder fibers, the melting point of the binder fibers being lower than that of the main fibers, wherein the unwoven fabric further includes a mesh structure in which the main fibers and the binder fibers are intertwined and welded to each other, wherein the mesh structure is obtained by pressing a fiber web in which the main fibers and the binder fibers are intertwined, and wherein the unwoven fabric is formed into a predetermined outer shape; and
   at least one additional layer attached to the unwoven fabric, wherein the additional layer has a function other than noise absorbing function.

2. The exterior component according to claim 1, wherein the main fibers are polyamide fibers, and the binder fibers are polyester fibers.

3. The exterior component according to claim 2, wherein the diameters of the main fibers are between 10 and 50 $\mu$m, and the diameters of the binder fibers are between 10 and 50 $\mu$m.

4. The exterior component according to claim 1, wherein the main fibers are polyamide fibers of discarded material.

5. The exterior component according to claim 1, wherein the additional layer is a water-resistant film.

6. The exterior component according to claim 1, wherein the additional layer is an outer layer, wherein the outer layer is made of an unwoven fabric including first polyester fibers and second polyester fibers, wherein the melting point of the second polyester fibers is lower than that of the first polyester fibers, and wherein the first polyester fibers and the second polyester fibers are intertwined and pressed to form the unwoven fabric.

7. The exterior component according to claim 1, wherein the additional fabric is adhered to the unwoven fabric.

8. The exterior component according to claim 5, wherein the water-resistant film is made of an olefin based resin or rubber.

9. The exterior component according to claim 1, wherein the exterior component is formed to be a shape conforming to the surface of a wheel housing of a vehicle.

10. The exterior component according to claim 1, wherein the thickness of the unwoven fabric is between 2 and 8 mm.

11. The exterior component according to claim 1, wherein the basis weight of the unwoven fabric is between 800 and 1300 g/m².

12. The exterior component according to claim 8, wherein the thickness of the water-resistant film is between 0.1 and 1 mm.

13. The exterior component according to claim 1, wherein the water-resistant film is made of polyethylene, polypropylene, ethylene-butene rubber, or ethylene-propylene-diene copolymer synthetic rubber.

14. The exterior component according to claim 4, wherein the discarded material is of discarded air bags.

15. The exterior component according to claim 1, wherein the thickness of the unwoven fabric is between 2 and 8 mm, and the thickness of the additional layer is between 0.5 and 3.0 mm.

16. A method for manufacturing an exterior component, wherein a fiber web is formed by intertwining main fibers with binder fibers, the melting point of binder fibers being lower than that of the main fibers, wherein a water-resistant film is brought into close contact with the surface of the fiber web, and wherein the fiber web and the film are pressed to form the exterior component.

17. A method for manufacturing a vehicle exterior component, comprising:

forming an inner layer and an outer layer, wherein each layer is made of an unwoven fabric, and wherein the unwoven fabric is formed by intertwining main fibers with binder fibers and pressing the intertwined fibers;

forming a laminated object by laminating the outer layer on the inner layer;

preheating the laminated object; and setting the preheated laminated objected in a pressing apparatus, and trimming portions to be cut at the edge of the laminated object while heating the portions to be cut.

18. The method according to claim 17, wherein the inner layer and the outer layer are adhered to each other when the laminated object is formed.

* * * * *